G. E. Hayes,
Making and Mounting Teeth.
Nº 16,482. Patented Jan 27, 1857.

UNITED STATES PATENT OFFICE.

GEORGE E. HAYES, OF BUFFALO, NEW YORK.

MOUNTING OF ARTIFICIAL TEETH.

Specification of Letters Patent No. 16,482, dated January 27, 1857.

*To all whom it may concern:*

Be it known that I, GEORGE E. HAYES, of Buffalo, in the county of Erie and State of New York, have invented a new and useful Improvement in the Construction of and Mode of Mounting Porcelain or Mineral Teeth upon Platina or other Metal Plates for a Continuous Gum; and I do hereby declare that the following is a full, clear, and exact description of the same, reference being had to the accompanying drawings, forming part of this specification, in which—

Figure 1:
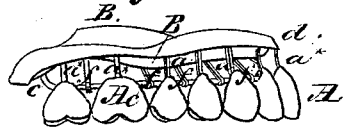
Figure 5:
Figure 2:
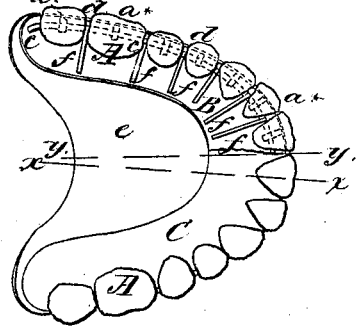
Figure 6:
Figure 3:
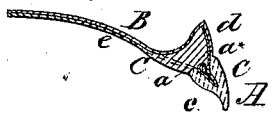
Figure 4:
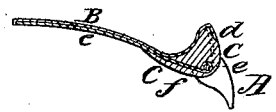

Figure 1 is a side view of a platina plate for an upper jaw with teeth attached, as it appears before the gum is applied, exhibiting the platina connections of the teeth with the plate. Fig. 2, is a view of the inner side of the said plate and teeth with one half the gum applied but the other half omitted to expose the platina connections. Fig. 3, is a section of the same in the line (x) (x) of Fig. 2. Fig. 4, is a section of the same in the line (y) (y) of Fig. 2. Fig. 5, is a side view of one of the teeth in its condition before it is applied to the plate. Fig. 6, is a side view of the wire that is shown attached to the tooth in Fig. 5, exhibiting it detached from the tooth.

Similar letters of reference indicate corresponding parts in the several figures.

My invention consists in a certain mode of applying the platina connections by which the teeth are attached to the plate and retained in place, whereby I am enabled to represent all parts of the teeth and gums of the natural shape and proportion, and also to afford to the work when finished greater power of resisting any strain in the mastication of food or other ordinary uses of the teeth than is afforded by any of the modes of applying the connections generally used.

To enable others skilled in the art of dentistry to make and use my invention I will proceed to describe it with reference to the drawings.

The teeth A, A, are all molded to represent the natural crowns on both sides and with a groove (b), see Fig. 5; extending across the base in the direction of the alveolar ridge to receive a wire frame c, upon which they are first mounted. Upon each side of this groove a flattened platina wire, a, a*, which is inserted in the tooth in the molding process, stands out from the base of the tooth, the part a, at the back of the groove projecting sufficiently from the tooth to fold over or around the wire frame, c, to which it is to be soldered, and the part a*, at the front of the groove projecting of a sufficient length to serve the purpose of a standard by which the tooth is to be soldered to the plate.

The parts a, a*, of the wire may be made separate and each inserted by itself in the body of the tooth, but I prefer to make it of one piece folded as shown in Fig. 6, the folded part entering the tooth as shown by dotted outline in Fig. 5 and serving the purpose, in case a tooth gets broken, of a pivot by which a common pivot tooth may be attached and cemented by additional enamel.

To mount the teeth, a plate, B, is swaged in the ordinary form and manner and a band, d, made of plate or wire is soldered to or otherwise formed upon its external margin, then a second plate, e, is swaged upon the same die as the plate B, sufficiently large to cover all that part thereof not intended to be occupied by the gum body. This plate, e, is firmly soldered to the first plate, leaving its edge raised sufficiently, as shown in Figs. 3 and 4, to receive and make a good finish with the gum G, and forms, at the posterior margin of the alveolar ridge, a continuation with the band. The double plate thus formed having been fitted to the mouth, wax is placed on the alveolar ridge, and the teeth are arranged in the position they are intended to occupy, taking care that the platina standards, a*, reach within the margin of the band, d. The plate is then placed upon the articulator and a plaster impression taken of the articulatory surfaces of the teeth for future use, after which the plate, having the teeth attached by the wax, is removed from the articulator and the teeth are covered with a composition of sand and plaster, and when this becomes hard the plate and the wax are removed from the teeth which are left in the sand and plaster. The platina standards a* must now be bent outward to allow the interstices or cavities between the teeth to be filled with plaster so as to form a continuous groove, in the bottom of which the grooves in the bases of the teeth will be exposed. From this groove a cast of tin or other sufficiently hard metal, fusible at a low temperature, is taken, and from this a counter cast is taken, in which to stamp a platina wire which will fit the grooves in the base of the teeth, said wire to form the frame, c, before mentioned and represented in Figs. 1, 2, 3, 4. The short portions, a, of the wires a, a*, of the teeth have now to be folded over the wire frame, c, and other pieces of flattened wire, f, to serve as stays are folded around the wire frame, c, between the teeth, and the said portions, a, and wires, f, soldered to the said frame, after which the composition of plaster and sand is removed from the teeth. The plate is next placed upon the articulator, and the teeth in the cast before mentioned as having been taken for future use, and the teeth and plate being brought together have the same relative positions they occupied before they were for the first time placed in the articulator. The next thing to be done is to bring the standards a* into position against the inside of the band, d, or the part of the plate B near thereto, and to bring the ends of the wire frame, c, up to meet the alveolar ridge near the posterior margin thereof and to secure each standard and each end of the frame temporarily to the plate by a drop of cement made of wax and rosin after which the cast is removed from the articulatory surface of the teeth and the ends of the stays are fitted up to the slope of the alveolar ridge. When this has been done the teeth are once more covered with the composition of sand and plaster, and the stays, standards and frame, c, c, are firmly soldered to the plate, the stays and standards forming a trestle work upon which the wire frame and teeth are supported. The work is now ready for the gum body, C, which may be applied in any of the ordinary modes.

For the lower jaw the plate is constructed in the same manner as that for the upper jaw above described, with the exception that the band d, is continued all around the inside or back, as well as on the front or external margin, the back part of the band taking the place of the small plate e, and the part of the main plate B, that is covered by it.

I do not claim the continuous gum body; nor do I claim the mounting of teeth on a wire frame when that is used otherwise than as herein described; neither do I claim the soldering of a wire from one pivot to another when such pivots are arranged along the alveolar ridge, as that was done by Delabarre. But

What I claim as my invention and desire to secure by Letters Patent, is.

1. Providing the teeth severally with a groove b, in the base for the purpose of receiving a wire frame c, or its equivalent with a wire or wires a, a*, projecting from the base on each side of the said groove for the purpose of serving as connections with the plate and with the wire frame substantially as herein specified thereby enabling the natural crown to be represented on both sides of the tooth and dispensing with the ordinary backing.

2. And I also claim the attachment of the teeth to a wire frame c, when the said frame is employed in addition to a direct connection with the plate and stayed to the plate by stays f, f, substantially as herein described to give additional stability and security to the teeth.

GEO. E. HAYES.

Witnesses:
J. F. BUCKLEY,
J. W. COOMBS.